R. HUNTINGTON.
COMPASS.
APPLICATION FILED MAR. 22, 1912.

1,215,808.

Patented Feb. 13, 1917.
2 SHEETS—SHEET 1.

WITNESSES
R. B. Ellms
Vera E. Fogg

INVENTOR
ROBERT HUNTINGTON
BY
ATTY.

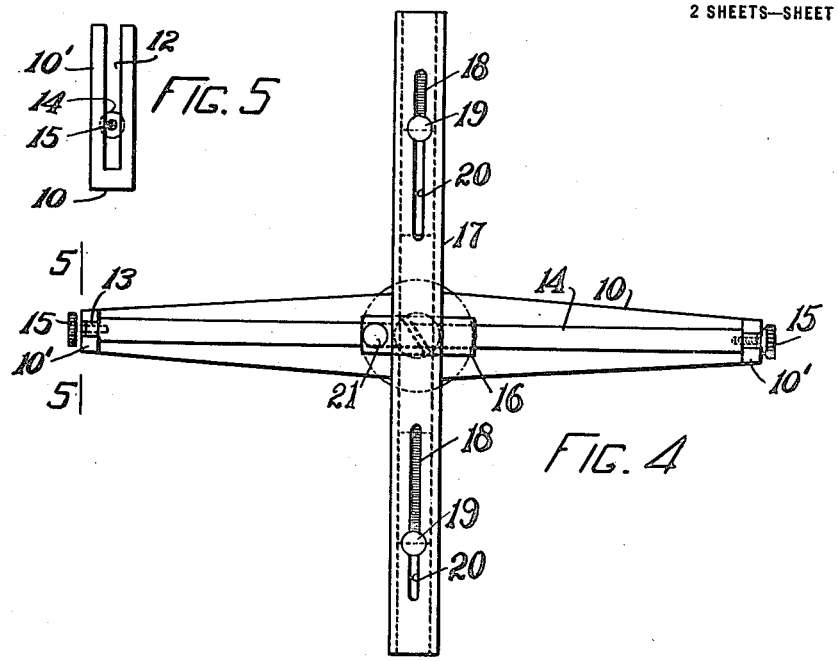
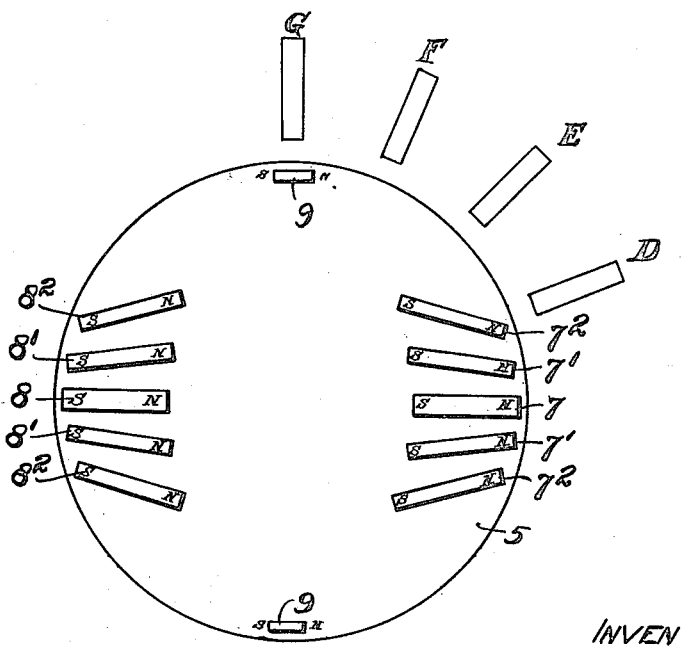

UNITED STATES PATENT OFFICE.

ROBERT HUNTINGTON, OF SOUTH MEDFORD, MASSACHUSETTS.

COMPASS.

1,215,808.  Specification of Letters Patent.  Patented Feb. 13, 1917.

Application filed March 22, 1912. Serial No. 685,645.

*To all whom it may concern:*

Be it known that I, ROBERT HUNTINGTON, a citizen of the United States, residing at South Medford, Massachusetts, have invented certain new and useful Improvements in Compasses, of which the following is a specification.

This invention relates to magnetic compasses such as are used on board vessels and has for its particular object the correcting or overcoming of the effect of local, permanent magnetism due to the metal used in ship constructing.

As is well known, the effect of polar magnetism induces certain magnetic currents through the frame of a ship, causing it, in time, to assume some of the properties of a permanent magnet. As such the metal work of the vessel will have a certain influence upon the compass and under such influence the needle of the latter will be somewhat drawn from its true course.

The term "sub-permanent magnetism" has been given to this force and the deflection of the needle is known as "deviation."

When the sub-permanent magnetism of the vessel is equally distributed along the keel, its effect upon the needle is zero when the ship is headed magnetic north or south but should the ship be headed magnetic east or west, the effect of this local attraction will cause repulsion of the north end and attraction of the south end of the needle from its proper course, causing westerly or easterly deviation, respectively.

When this sub-permanent magnetism is unequally distributed along the keel of the vessel as is generally the case, due to the unequal distribution of the metal which induces it, the point of non-attraction (the zero above) lies in a plane slightly to the right or left, (as the particular case may be) of the line of the keel, and the line of no deviation is slightly deflected from the north and south magnetic course.

To overcome these difficulties, I have invented a new form of compass, which greatly minimizes the deviation of the needle and have added what I will call a sub-permanent magnetism adjuster, the object of the latter being to correct the unequal effect of local attraction noted in the preceding paragraph.

As this sub-permanent magnetism adjuster is applicable to all forms of compasses, I do not claim it broadly herein but make it the subject of a separate application filed concurrently herewith.

In the drawings which accompany and form part of this specification:

Fig. 3 is a diagram similar to Fig. 2.

Fig. 4 is a plan of my adjuster, and

Fig. 5 is an edge view of one end of same.

Figure 1:
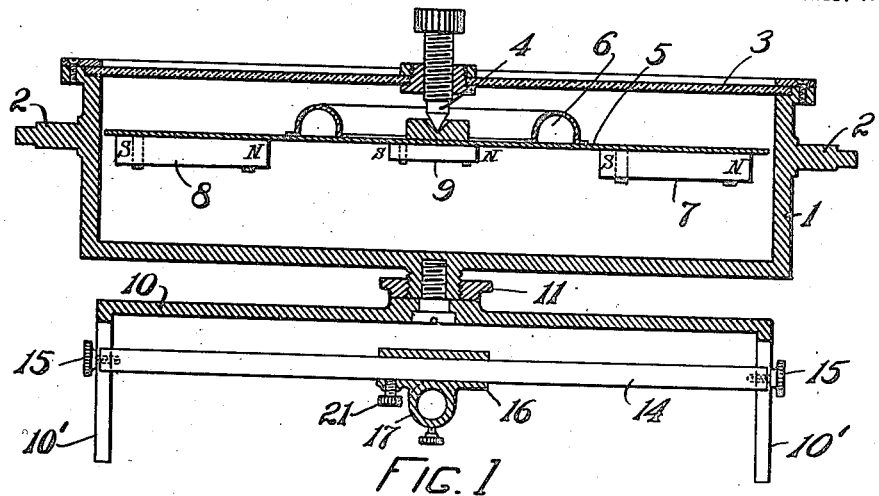
Figure 1 is a vertical central section of my compass box with adjuster attached.

The compass-box 1, provided with the ordinary pintles 2, 2 for mounting on a binnacle has a glass cover 3 hermetically sealed to the box 1 so that the spirits or other liquid with which the latter is filled may not escape. The needle-pivot 4 is adjustably mounted on top of this cover 3 and the compass-dial 5 is buoyed, as by a suitable float 6, so as to make its pressure within the liquid upward against said pivot 4. This method of pivoting the compass-dial I believe to be entirely new.

Underneath the dial 5, and secured thereto I place one or more pairs of permanent magnets 7, 8, their magnetic axis being the N.—S. line of dial 5.

The fundamental idea of this invention consists in separating these magnets, one of a pair being placed near each outer edge of the dial 5 along the N.—S. line, with the north seeking end of each toward the N. end of said line.

My objects in providing the dial with the auxiliary pairs of magnets $7^1$, $8^1$, $7^2$, $8^2$, secured thereto are two-fold, viz: to increase the strength and broaden the magnetic field of influence, the common axis of attraction being the N.—S. line of the dial 5. By broadening the magnetic field, the "zero" effect of sub-permanent attraction will be maintained for courses slightly off the magnetic N. or S., the amount of course depending upon the relative strengths.

Figure 2:
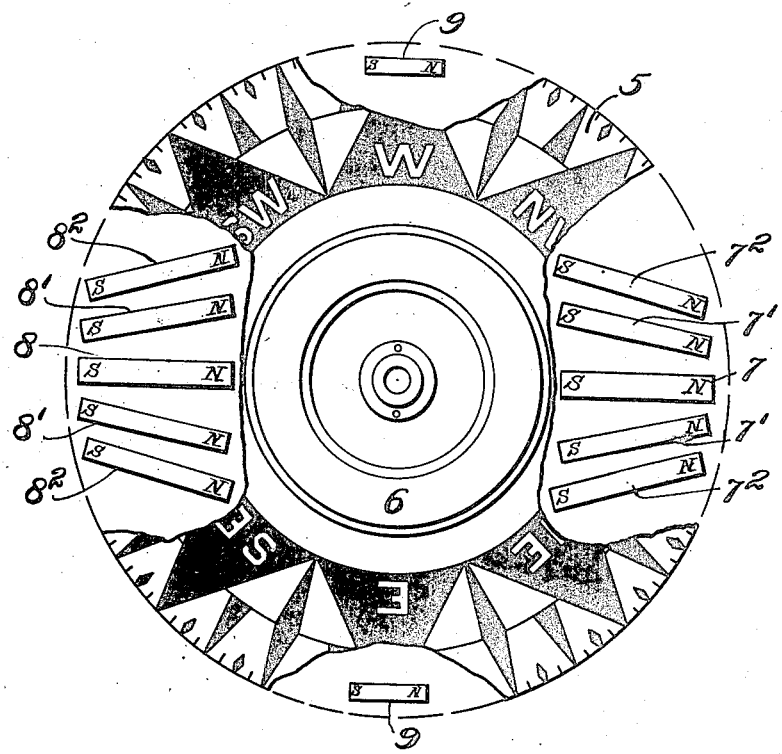
Fig. 2 is a plan view of my compass-dial partly broken away to show magnets underneath.

As an added feature, I prefer to converge these auxiliary magnets toward their respective poles, as seen in Figs. 2 and 3.

To still further lessen the deviation curves above described, I prefer to secure to the dial small side magnets 9, 9 mounted near the east and west points of the dial 5, the polarities of which are indicated by ends marked No. S. respectively as in the magnets 7 and 8.

In the case of unequally distributed sub-permanent magnetism, it has been the practice to introduce counter attractions which neutralize this inequality. This I have done, but in a way which I believe to be entirely new.

To the under side of compass-box 1, I pivotally attach a U-shaped frame 10 and provide a lock-nut 11 to frictionally lock the frame 10 in any desired position. Each downturned lug 10¹ is provided with a slot 12 adapted to slidably receive the flattened end 13 of a round rod 14. Binding screws 15 serve to frictionally lock the rod 14 at any desired height below the box 1.

Slidably and rotatably mounted on the rod 14 is the boss 16 of a fiber, paper or rubber tube 17, the latter being adapted to receive one or more magnets 18, which may be held in place by set-screws 19, the latter working through grooves 20 in the tube 17 to permit sliding of the magnets 18 within the same. By means of the set screws 21 the tube 17 may be secured at any transverse position on the rod 14 and also at any vertical angle which the dip of the magnetic needle may render necessary.

I thus provide a universally adjustable sub-permanent magnetism adjuster, within the limits that practice has shown to be necessary.

The proper adjustment of the magnets 18 once found, they need not be changed unless there is cause to believe that the inequality of the sub-permanent magnetism of the vessel has been changed.

What I therefore claim and desire to secure by Letters Patent is:

1. In combination, a compass box, a dial pivotally mounted therein, a pair of main magnets mounted on said dial at opposite sides thereof, a pair of auxiliary magnets mounted on said dial opposite to each other but not to the main magnets, a mount for a pair of corrective magnets pivotally hung from said compass box, and a corrective magnet adjustable along each end of said mount.

2. In combination, a compass box, a dial pivotally mounted therein, sets of magnets mounted on said dial at opposite sides thereof, auxiliary magnets mounted on said dial opposite to each other but not to the sets of magnets, a mount for a pair of corrective magnets pivotally hung from said compass box, and a corrective magnet adjustable along each end of said mount.

3. In combination, a compass box, a dial pivotally mounted therein, a pair of main magnets mounted on said dial at opposite sides thereof, sets of magnets disposed on opposite sides of each main magnet, auxiliary magnets mounted on said dial opposite to each other but not to the main magnets, a mount for a pair of corrective magnets pivotally hung from said support, and a corrective magnet adjustable along each end of said mount.

4. In combination, a compass box, a dial pivotally arranged therein, a pair of main magnets mounted on said dial at opposite sides thereof, a pair of auxiliary magnets mounted on said dial opposite to each other but not to the main magnets, a frame pivotally hung from said compass box, a rod adjustable in said frame, a slide adjustable along said rod, and a corrective magnet adjustable on each end of said slide.

5. In combination with a compass box providing a mounting for a pivoted compass, a frame, means for supporting said frame in pivotal relation to the pivot of the compass, a rod mounted in said frame for vertical adjustment in the plane of the pivot, a transverse member mounted on said rod and slidable thereon, a magnet adjustably mounted on each end of said transverse member, and means whereby said magnets may be adjusted in lateral relation to said rod.

6. In combination with a compass box, a depending frame, a horizontal rod mounted in said frame for vertical adjustment therein, a transverse member mounted on said rod and slidable thereon, means for locking said member on said rod, a magnet on each end of said member and means whereby said magnets may be adjusted in lateral relation to said rod.

7. In combination with a compass box, a depending frame having a pair of oppositely disposed lateral slit arms, a rod having its ends mounted in said slits, means for clamping said rod ends within said slits, a tube transversely mounted on said rod and slidable thereon, means for locking said tube on said rod, a magnet on each end of said tube, and means whereby said magnets may be adjusted in lateral relation to said rod.

8. In combination with a compass, a vertically adjustable support, a member adjustable laterally on said support, and a magnet adjustable on each end of said member.

9. In combination, a compass box, a frame pivotally hung from said box, a magnet carrying member, means for supporting the same with relation to said frame whereby the member is vertically, laterally and transversely adjustable, and a magnet independently adjustable along each end of said member.

10. In combination, a compass box, having a threaded boss on its under face, a magnet support pivotally hung from said boss, and a pivotal connection between said boss and support consisting of a screw in said support and threaded into said boss, said screw permitting a limited vertical adjustment of the support relative to the compass box and permitting swinging movement of said support about the pivot as an axis, and means for holding said vertical adjustment.

11. In combination with a compass box, a frame pivotally connected therewith, a rod adjustable in said frame, a bearing adjustable on said rod, a slide adjustable in said bearing, and a magnet adjustably mounted on each end of said slide.

In testimony whereof I affix my signature in presence of two witnesses.

ROBERT HUNTINGTON.

Witnesses:
  R. B. ELLMS,
  VICTORIA LONDEN.